(12) United States Patent
Katsikis et al.

(10) Patent No.: US 11,945,133 B2
(45) Date of Patent: Apr. 2, 2024

(54) APPARATUS FOR PRODUCING COMPONENTS BY WAY OF ADDITIVE MANUFACTURING PROCESSES

(71) Applicant: KYOCERA Fineceramics Precision GmbH, Selb (DE)

(72) Inventors: Nikolaos Katsikis, Waldsassen (DE); Sarah Diener, Selb (DE); Carsten Russner, Lauf a.d. Pegnitz (DE); Pedro Henrique Da Silva Lima, Rehau (DE)

(73) Assignee: KYOCERA Fineceramics Precision GmbH, Selb (DE)

( * ) Notice: Subject to any disclaimer, the term of this patent is extended or adjusted under 35 U.S.C. 154(b) by 323 days.

(21) Appl. No.: 17/426,229

(22) PCT Filed: Feb. 4, 2020

(86) PCT No.: PCT/EP2020/052746
§ 371 (c)(1),
(2) Date: Jul. 28, 2021

(87) PCT Pub. No.: WO2020/161132
PCT Pub. Date: Aug. 13, 2020

(65) Prior Publication Data
US 2022/0105657 A1    Apr. 7, 2022

(30) Foreign Application Priority Data
Feb. 4, 2019    (EP) .................................... 19155205

(51) Int. Cl.
*B33Y 30/00* (2015.01)
*B22F 12/50* (2021.01)
*B22F 12/57* (2021.01)
*B22F 12/58* (2021.01)
*B22F 12/67* (2021.01)
(Continued)

(52) U.S. Cl.
CPC .............. *B28B 1/001* (2013.01); *B22F 12/50* (2021.01); *B22F 12/67* (2021.01);
(Continued)

(58) Field of Classification Search
CPC .......... B22F 12/52; B22F 12/57; B22F 12/58; B22F 12/67; B22F 10/14; B22F 10/28;
(Continued)

(56) References Cited

U.S. PATENT DOCUMENTS 8,425,816 B2 * 4/2013 Okamoto ............... B33Y 10/00
264/109
10,870,237 B2  12/2020 Kao et al.
(Continued)

FOREIGN PATENT DOCUMENTS

DE    10 2015 010 386 A1    2/2017
DE    10 2015 222 100 A1    5/2017
(Continued)

OTHER PUBLICATIONS

International Search Report for PCT/EP2020/052746, dated Apr. 3, 2020, 3 pages.
(Continued)

*Primary Examiner* — Mary Lynn F Theisen
(74) *Attorney, Agent, or Firm* — Dority & Manning, P.A.

(57) ABSTRACT

The invention relates to an apparatus for applying slurries, comprising a doctor blade body with at least one separation element that subdivides the doctor blade body into different compartments, and to a method for producing a three-dimensional object using the apparatus according to the invention.

19 Claims, 2 Drawing Sheets

Figure 1:
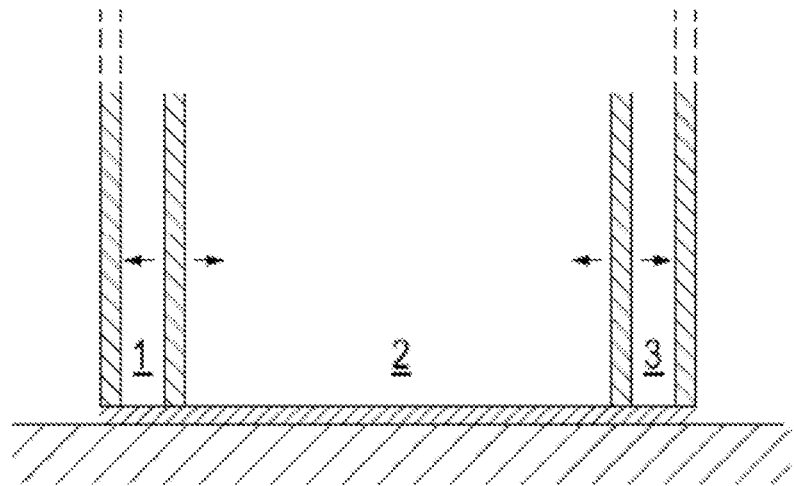

(51) Int. Cl.
  *B28B 1/00* (2006.01)
  *B28B 13/02* (2006.01)
  *B29C 64/214* (2017.01)
  *B29C 64/336* (2017.01)
  *B33Y 10/00* (2015.01)
  *B33Y 40/10* (2020.01)
  *B22F 10/14* (2021.01)
  *B22F 10/28* (2021.01)

(52) U.S. Cl.
  CPC ........ *B28B 13/0275* (2013.01); *B29C 64/214* (2017.08); *B29C 64/336* (2017.08); *B33Y 10/00* (2014.12); *B33Y 30/00* (2014.12); *B33Y 40/10* (2020.01); *B22F 10/14* (2021.01); *B22F 10/28* (2021.01); *B22F 12/57* (2021.01); *B22F 12/58* (2021.01); *B28B 2013/0265* (2013.01)

(58) Field of Classification Search
  CPC .......... B22F 10/34; B22F 10/37; B22F 10/38; B29C 64/329; B29C 64/336; B29C 64/343; B29C 64/214; B29C 64/153; B29C 64/165; B33Y 10/00; B33Y 30/00; B33Y 80/00; B33Y 70/10; B28B 1/001; B28B 13/0275; B28B 2013/0265
  See application file for complete search history.

(56) References Cited

U.S. PATENT DOCUMENTS

| | | | |
|---|---|---|---|
| 10,894,360 B2 * | 1/2021 | Prakash | .................. B22F 12/55 |
| 2018/0369917 A1 * | 12/2018 | Mottin | ...................... B22F 5/04 |
| 2019/0091921 A1 | 3/2019 | Paternoster et al. | |
| 2020/0055245 A1 | 2/2020 | Kao et al. | |
| 2020/0223011 A1 | 7/2020 | Hofacker et al. | |
| 2022/0347922 A1 * | 11/2022 | Hascoët | ................ B29C 64/214 |

FOREIGN PATENT DOCUMENTS

| | | |
|---|---|---|
| EP | 3 345 745 A1 | 7/2018 |
| JP | H07299811 A | 11/1995 |
| WO | WO 2018/024757 A1 | 2/2018 |
| WO | WO 2018/090186 A1 | 5/2018 |
| WO | WO 2019/020317 A1 | 1/2019 |
| WO | WO 2019/022759 A1 | 1/2019 |

OTHER PUBLICATIONS

Japanese Office Action Corresponding to Application No. 2021-545435 dated Oct. 17, 2023.

* cited by examiner

APPARATUS FOR PRODUCING COMPONENTS BY WAY OF ADDITIVE MANUFACTURING PROCESSES

CROSS REFERENCE TO RELATED APPLICATIONS

This application is the national stage entry of International Patent Application No. PCT/EP2020/052746 having a filing date of Feb. 4, 2020, which claims priority to and the benefit of European Patent Application No. 19155205.8 filed in the European Patent Office on Feb. 4, 2019, the entire contents of which are incorporated herein by reference.

The present invention relates to a device for applying slips, comprising a doctor blade body with at least one separating element through which said doctor blade body is divided into different compartments, and to a process for preparing a three-dimensional object using the device according to the invention.

The commercial application of additive manufacturing methods allows complex components and small series to be produced at low cost. In such methods, a powdery material is applied to a support structure by using a doctor blade, and cured along a predetermined geometry, and then another layer of the powdery material is applied and cured. Alternatively, the curing may also be completed after the printing process. This procedure is repeated until the desired three-dimensional body has been formed. A drawback of these methods is the fact that, when different materials are used for the selective formation of different properties in the three-dimensional body to be prepared, the powder feeds are difficult to empty and subsequently refill, before the doctor blade can be used with another material, or alternatively several doctor blades have to be used.

For solving this problem, DE 19 2916 214 249 proposes a device for the generative manufacturing of a three-dimensional body in a powder bed, comprising a manufacturing zone that has a lowerable surface on which the powder bed is provided, and at least one doctor blade for promoting and uniformly distributing a powdery material on the surface. Said at least one doctor blade can be moved around a rotation axis that is oriented perpendicularly to the surface of the powder bed, and the length of the doctor blade is at least equal to the largest distance from the rotation axis to the edge of the manufacturing zone. Nozzles for ejecting the powdery material are formed on said at least one doctor blade. Further, a means for feeding the powdery material in said at least one doctor blade and to the nozzles and a means for performing a rotational movement of said at least one doctor blade over the surface of the powder bed, and a means by which at least one beam of actinic radiation can be directed to the surface of the powder bed and whose focus can be moved two-dimensionally, are provided on the device.

EP 3 345 745 describes a manufacturing plant for manufacturing a component by means of an additive manufacturing process, in which a formless material is applied layer-wise and selectively cured on the basis of a digital data model, wherein the manufacturing plant comprises a material reservoir in which a primary material is provided, a component space in which the primary material is applied layer-wise and selectively cured, at least one squeegee which can be moved over the component space and is formed for a layer-wise application of the primary material, which is provided by the material reservoir over the component space during movement, and an energy source formed for selectively curing the layer-wise applied primary material. The manufacturing plant described is further characterized in that a squeegee is provided which can be moved over the component space and is formed for applying at least one further secondary material during the movement over the component space, wherein the squeegee has a material removal device formed for selectively removing within at least one predetermined secondary material section an already applied primary material. In this way, additional functions are to be incorporated into the structure to be manufactured, such as, for example, electronic lines or insulators.

WO 2018/024757 relates to a device for the generative production of a three-dimensional body in a powder bed having a production region, which has a lowerable surface on which the powder bed is arranged, and having a plurality of doctor blades for uniform distribution of a supplied powdery material over the surface of the powder bed, and an apparatus by means of which at least one energy beam can be directed onto the surface of the powder bed, the focal spot thereof being movable in two dimensions. Using the doctor blade, different powdery materials and/or powdery materials having different mean particle size ranges can be applied to the surface of the powder bed.

DE 10 2015 010 386 discloses a device for the generative production of three-dimensional objects by laser micro-application melting, in which the doctor blade is formed as a dual doctor blade filled with a powder reservoir for applying an individual powder layer, in order to generate a powder layer in each forward and backward movement of the dual doctor blade, which can be radiated with the laser immediately and cured in the zone of the three-dimensional object to be built on a construction platform. The dual doctor blade includes a powder uptake part that can be filled automatically from a powder storage vessel and comprises a powder discharge slot provided in the bottom thereof, and a dual doctor blade part contiguous with its bottom that consists of two parallel single doctor blades, having powder guiding surfaces protruding from the powder discharge slot for distributing the powder in each forward and backward movement of the dual doctor blade.

The solutions proposed in the prior art have the disadvantage that a complicated design of the device is necessary to prepare components from different materials. Further, the devices described in the prior art do not allow components to be prepared in which the transition between the different materials or powders is fluent, and which have a gradient. In order to master this problem, the prior art proposes doctor blades in which different kinds of powders can be discharged by using different dosing chambers or partition walls.

Thus, DE 10 2015 222 100 describes a method and a device for producing a three-dimensional object by the layer-wise application and selective compacting of a powdered building material in which the device includes a coating element that can be moved over a construction field for applying a layer of the building material to the construction field, and a compacting device for the selective compaction of the layer applied in places that correspond to a cross-section of the object to be prepared, and is designed and/or controlled to repeat the steps of applying and selectively compacting until the object is completed, in which the device includes a coating unit that includes: two coating elements which are spaced apart from one another in a first direction and extend in a direction transverse to the first direction, and delimit in the first direction and in the opposite direction thereto a receiving space for the powdered building material, and an intermediate wall which is arranged between the two coating elements at a distance from the two coating elements in the first direction, and extends in a direction transverse to the first direction, whereby the receiving space for the building material is divided into two chambers, wherein the coating unit is designed to receive building material in the chamber that is trailing in the respective direction of movement, depending on the movement of the coating unit in the first direction or in the opposite direction thereto, and to draw out the building material that has been received in the respectively trailing chamber with the respectively trailing coating element to form a uniform layer.

WO 2019/020317 proposes an installation for the powder-bed-based additive manufacturing of a workpiece with several metering devices for different types of powder, and methods for operating it. A receiving device is provided for the powder bed, wherein the powder bed can be applied by multiple metering devices.

According to the invention, it is provided that each of the metering devices has a metering slit, through which a certain type of powder can be applied to the powder bed. According to the invention, the receiving device and the metering devices are movable in relation to one another, and so, with the aid of the metering slit, powder can be applied to the entire surface of the powder bed. The metering of different types of powder on the same powder bed is advantageously possible, while at the same time the overall size of the installation is small.

WO 2019/022759 describes a 3D printer including a vessel to discharge build material, wherein the vessel includes a throttle by which the flow of build material can be varied.

To date, the efforts in the provision of devices by which different materials can be discharged have been concentrated, in particular, at powders, because these are the usual material for preparing a three-dimensional object. However, in some applications, it has been found that the demanded properties are not achieved with powders, so that it may be advantageous to apply the material in the form of a slip, whereby the technical demands on the discharge device are changed, however, so that devices designed for the application of powders are not necessarily employable with slips as well. Thus, in particular, slip-like materials have a flow behavior that is different from that of purely powders materials. Further, the flow behavior of a slip has a critical influence on the quality of the object to be produced, so that this property plays an important role not only in the development of slips, but also in the technical implementation of the manufacturing method.

Further, when partition walls by which the doctor blade can be divided into different zones as proposed in the prior art are used, there is a problem in that a hermetic seal between the partition wall and the doctor blade can be ensured only in rare cases, especially if the partition walls are supposed to be provided in a movable way. However, the gap that is forming may lead to an interfering influence on the flow behavior of the material and even clogging and blockage, which significantly reduces the quality of the object to be prepared, especially when slips are used.

Therefore, it has been the object of the present invention to provide a device that enables the production of three-dimensional articles that have different properties and/or compositions in horizontal and/or vertical directions, for example, a gradient, by using slips in an additive manufacturing method, and that overcomes the mentioned problems of the prior art.

Within the scope of the present invention, it has been surprisingly found that this object is achieved by providing a device that includes a specifically designed doctor blade with several separated chambers.

Therefore, the present invention firstly relates to a device for applying slips, wherein said device includes a doctor blade body with a working edge, in which the doctor blade body has at least one discharge slot for discharging a slip, arranged in parallel to the working edge, characterized in that said doctor blade body is divided into chambers by at least one moveable dividing element arranged vertically to its longitudinal direction, wherein a gap having a width of at least 100 µm is formed between the lateral walls of said at least one dividing element and the adjacent surface of the doctor blade.

Within the scope of the present invention, the terms "adjacent" and "opposing" are to be considered exchangeable, unless stated otherwise.

Surprisingly, it has been found that, because of the design of the doctor blade body according to the invention, three-dimensional objects that have composition and/or properties that vary over the dimension of the object, for example, a gradient, can be prepared from slips, wherein "gradient" within the meaning of the present invention designates a continuous variation of the composition or properties over some length within or on the surface of an object. Conventionally, the formation of a gradient in an object is realized through an exchange of the storage vessels for the building material, wherein the formation of the gradient is limited to the z direction, however. Now, it has surprisingly been found that gradient can also be formed in x and/or y directions by the device according to the invention.

Further, it has been found that the design according to the invention, which provides a gap of at least 100 µm between the lateral walls of the dividing element and the adjacent or opposing surface of the doctor blade, against general expectations does not adversely affect the flow behavior of the slip, but rather the freedom to move of the dividing element is maintained in this way, and a continuous discharge of the slip is possible. The gap is preferably continuous and runs in parallel to the lateral wall of the dividing element. In a particularly preferred embodiment, the gap has a width of at least 200 µm, preferably at least 300 µm. Preferably, the gap has a maximum width of 1000 µm, preferably a maximum of 700 µm, and more preferably a maximum of 500 µm. In a particularly preferred embodiment, the gap has a width that is at least double, preferably three times, the D90 value of the particles contained in the slip. In a further preferred embodiment, the gap has a width that is at least double, preferably three times, the D98 value of the particles contained in the slip. The particle size may be determined by laser diffraction, while the D90 and D98 values of the particle size distribution refers to the fraction of the particles, namely 90% or 98%, respectively, that have a value less than or equal to the determined value.

In order to ensure the mobility of the dividing element while the flow behavior of the slip is positive, it has also been found advantageous to use a sealing element that is provided between the lateral wall or walls of the dividing element and the adjacent surface of the doctor blade. Therefore, an embodiment is preferred in which a sealing element is provided between said at least one dividing element and the adjacent surface of the doctor blade. Surprisingly, it has been found that, by using the sealing element, an impairment of the flow behavior of the slip and mixing of the slips contained in the different chambers of the doctor blade body can be prevented without limiting the mobility of the dividing element. In a preferred embodiment, the sealing element is designed in the form of a gasket, an O ring seal, or a lip seal, which is provided between the dividing element and the adjacent surface of the doctor blade.

It has been found particularly advantageous to design the sealing element in the form of groove-shaped indentations or teeth that are provided between the lateral wall of the dividing element and the opposing surface of the doctor blade. Therefore, an embodiment is preferred in which the sealing element is in the form of groove-shaped indentations or teeth that are provided on a lateral wall of the dividing element that faces the opposing surface of the doctor blade. The groove-shaped indentations or teeth preferably extend in a lengthwise direction along the lateral walls of the dividing element. More preferably, the groove-shaped indentations or teeth are directly worked out of the lateral wall of the dividing element, and form an integral part of the dividing element. The "lateral wall" of the dividing element refers to the narrow side of the dividing element, which is opposed to the surface of the doctor blade.

More preferably, the sealing element is made of a material selected from the group consisting of rubber, plastic, and Teflon. In this way, damage to the surface of the doctor blade, for example, when the dividing element is moved, is avoided.

The distance between the lateral wall of the dividing element and the opposing surface of the doctor blade is preferably selected to ensure sufficient mobility of the dividing element.

The thickness of the sealing element is preferably selected for the space between the lateral wall of the dividing element and the opposing surface of the doctor blade to be completely filled. To this end, it has been found particularly advantageous for the teeth to have a length that is about double the distance between the lateral wall of the dividing element and the opposing surface of the doctor blade. Therefore, an embodiment is particularly preferred in which the height of the teeth is the same as the distance between the lateral wall of the dividing element and the opposing surface of the doctor blade. More preferably, the height of the teeth is the same as 1.5 times to 3 times, especially 1.5 times to 2.5 times, the distance between the lateral wall of the dividing element and the opposing surface of the doctor blade.

For enabling the desired transition between the different materials, it has been found particularly advantageous for said at least one discharge slot to extend throughout the width of the doctor blade body. In a preferred embodiment, the discharge slot has a lip on at least one of its two edges with which the flow of the slip can be controlled. In this way, variations may be made between different discharge modes, such as the curtain coating mode, the bead coating mode, the web tensioned coating mode, and the extrusion coating mode.

The device according to the invention allows for the flexible adaptation of materials and properties of an object during its production. Therefore, an embodiment is preferred in which the chambers in the doctor blade body are reversibly separated.

Within the scope of the present invention, it has been found particularly advantageous if the size and number of the chambers in the doctor blade body can be varied. Therefore, an embodiment is preferred in which the size and/or number of the chambers in the doctor blade body is variable. In a particularly preferred embodiment, said at least one dividing element is one or more moveable slats, which are pivotable, in particular. In a particularly preferred embodiment, said at least one dividing element is moveable partition walls that can be varied horizontally, vertically and/or pivotably.

In order to ensure an efficient and continuous material feed, the doctor blade body can be equipped with inlet units for introducing the slip. In a preferred embodiment, the doctor blade body further has two or more inlet units through which the slip can be introduced into the doctor blade body. Said inlet units preferably lead into respectively separated chambers in the doctor blade body. Further, the inlet units preferably have connector elements for connection to a storage vessel.

The slip can be fed to the doctor blade body through the inlet units. For realizing the formation of a gradient in an object, it has been found advantageous for the slips to be different. Therefore, an embodiment is preferred in which the slips fed to the doctor blade body through the inlet units are similar or different, especially different. The slip is preferably introduced into the corresponding chamber of the doctor blade body by means of a dosing pump, where the flow of the slip can be homogenized before it is discharged through the discharge slot.

In order to increase the degrees of freedom in the production of three-dimensional objects, the device according to the invention may further have mixing aggregates. Therefore, an embodiment is preferred in which the device further has one or more mixing aggregates, preferably static mixers, that are connected to the inlet units.

The device according to the invention is suitable, in particular, for the production of objects by layer-wise construction. Therefore, in a preferred embodiment, the device according to the invention further has a production region with a moveable surface on which a component space is provided in which the slips are discharged and selectively cured.

In a preferred embodiment, in order to ensure a precise manufacture of the desired object, the device according to the invention further has a control unit for controlling the doctor blade body.

The device according to the invention is directed, in particular, to the production of objects that have a gradient, or for material systems consisting of two or more layers. Therefore, the present invention further relates to a process for preparing a three-dimensional object using additive manufacturing methods, in which one or more slips are discharged onto a surface using the device according to the invention, and selectively cured in accordance with a predetermined geometry. More preferably, within the scope of the process according to the invention, a first layer of a slip is applied to a support structure using the device according to the invention, and dried. Another layer of slip is applied to the dried layer, and dried, wherein the support structure is lowered by one layer height after each layer application of the slip. In order to obtain the desired object, preferably, a binder according to the desired cross-section is discharged, wherein said binder can be applied after each layer or only after several layers, depending on the layer thickness. The finished object is then obtained by curing the binder and removing the excess material. Within the scope of the present invention, it has been surprisingly found that a high packing density and a good bonding between the layers can be achieved by using slips. Further, it has been surprisingly found that an object having a high green density is obtained by drying each layer, which was not achieved by the use of powders, as in conventional processes.

In particular, the use of the device according to the invention allows for the production of objects that have a continuously or discretely varying composition and/or properties. Therefore, an embodiment of the process according to the invention is preferred in which the three-dimensional object has a composition and/or properties that vary over parts or all of the object, especially in x and/or y directions. More preferably, the object has one or more gradients that extend wholly or partly over the object. In an alternative preferred embodiment, the object has discrete regions having different properties and/or compositions. The composition and/or properties of the object may be adapted by selecting suitable slips. In a preferred embodiment, slips are used that contain 60 to 95 percent by weight solids, based on their total mass, and contain particles with a mean particle size of from 0.1 to 100 µm, as determined by laser diffraction. The slips are composed of ceramic particles, such as silicon carbide or silicon nitride, dispersing agents, sintering or processing aids, such as carbon sources, such as graphite or carbon black, and organic additives, such as binders.

The present invention further relates to an article obtained by the process according to the invention and/or by using the device according to the invention. Preferably, the article is a three-dimensional object that has one or more gradients or discrete regions having different properties and/or compositions. In particular, objects characterized by a high precision are obtainable by the process according to the invention. At the same time, material may be used that provide the object with a high strength and hardness, as needed, for example, for tools, such as drill heads. Therefore, the object is a drill head, in particular. Further, the process according to the invention and the device according to the invention allow the properties of the object to be set precisely, as demanded, for example, in high precision applications, for example, in semiconductor production. Therefore, in an alternatively preferred way, the object is wafer chucks.

The present invention further relates to the use of the device according to the invention for producing a three-dimensional object. Preferably, the three-dimensional object has a composition and/or properties that vary continuously or discretely, especially in x and/or y directions.

The device according to the invention is suitable, in particular, for use in additive manufacturing methods. Therefore, the present invention further relates to the use of the device according to the invention in additive manufacturing methods, especially laser selective sintering and binder jetting.

The present invention is illustrated in more detail by means of the following Figures, which are by no means to be considered as a limitation to the inventive idea, however.

FIG. 1 schematically shows a preferred embodiment of the invention in which the doctor blade body can be divided by moveable partition walls into different chambers (1, 2, 3), into which different slips can be correspondingly introduced.

Figure 2:
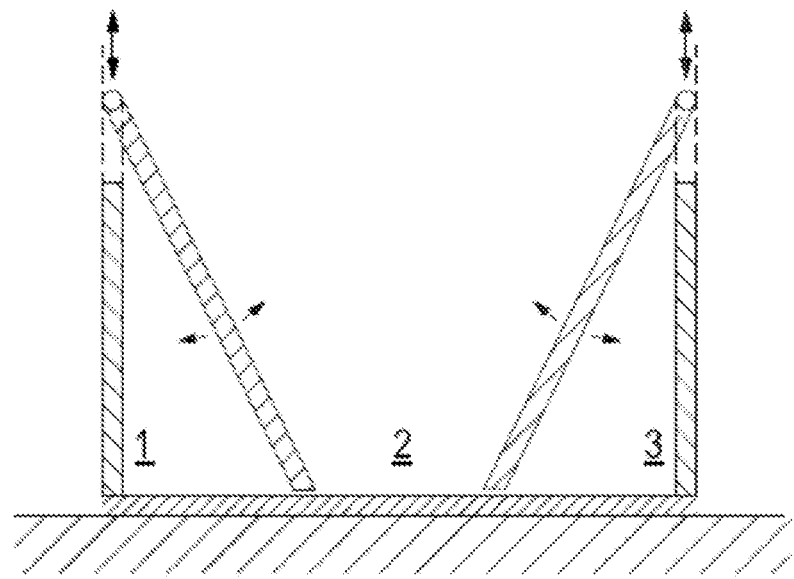

FIG. 2 schematically shows a preferred embodiment of the invention in which the partition walls have a pivotable design. In this way, the doctor blade body can be divided into different chambers (1, 2, 3), which allows for a selective mixing of the materials contained in the chambers within the doctor blade body for setting a gradient in the object to be produced.

Figure 3:
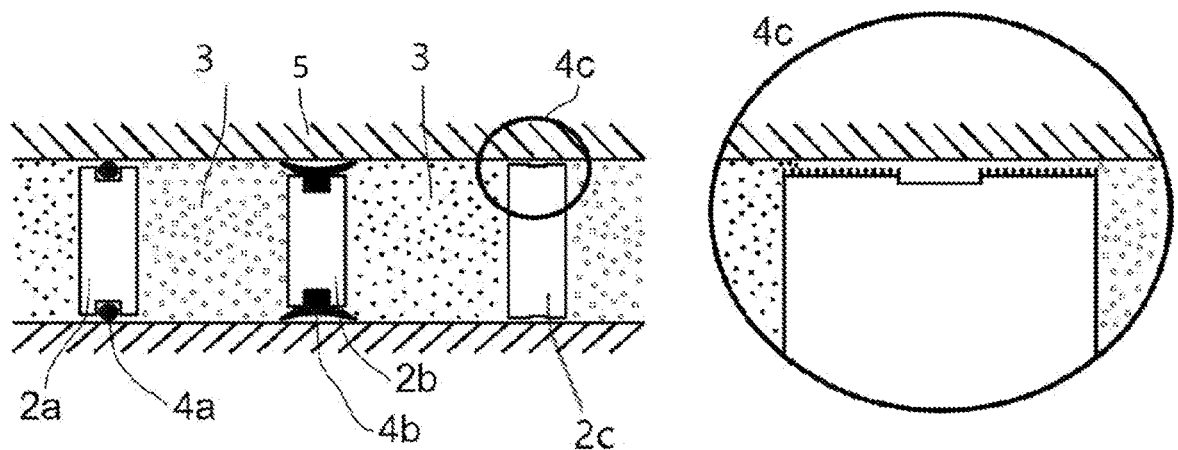

FIG. 3 shows an exemplary top view of alternatively preferred embodiments of the device according to the invention, in which the doctor blade body (5) is divided into different chambers (3) using dividing elements (2a, 2b, and 2c), wherein an O ring seal (4A), a lip seal (4B) or a sealing element in the form of groove-shaped indentations or teeth (4C) are used as sealing elements (4).

The invention claimed is:

1. A device for applying slips, wherein said device includes a doctor blade body with a working edge, in which the doctor blade body has at least one discharge slot for discharging a slip, arranged in parallel to the working edge, characterized in that said doctor blade body is divided into chambers by at least one moveable dividing element, the moveable dividing element being arranged vertically to the longitudinal direction of the doctor blade body, wherein a gap having a width of at least 100 µm is formed between lateral walls of said at least one dividing element and an adjacent surface of the doctor blade body.

2. The device according to claim 1, characterized in that said gap has a width of at least 200 µm.

3. The device according to claim 1, characterized in that a sealing element is provided in said gap.

4. The device according to claim 3, characterized in that said sealing element is provided with groove-shaped indentations or teeth on a lateral wall of the dividing element that faces an opposing surface of the doctor blade body.

5. The device according to claim 4, characterized in that said groove-shaped indentations or teeth are directly worked out of the dividing element.

6. The device according to claim 3, characterized in that said sealing element is made of a material selected from the group consisting of rubber, plastic, and Teflon.

7. The device according to claim 1, characterized in that said at least one discharge slot extends throughout a width of the doctor blade body.

8. The device according to claim 1, characterized in that said doctor blade body has at least two reversibly separated chambers.

9. The device according to claim 1, characterized in that the size and/or number of the chambers in the doctor blade body is variable.

10. The device according to claim 1, characterized in that said at least one dividing element is one or more moveable slats.

11. The device according to claim 1, characterized in that said doctor blade body further has two or more inlet units, which respectively have connector elements for connection to a storage vessel.

12. The device according to claim 11, characterized in that the slips fed to the doctor blade body through the inlet units are similar or different.

13. The device according to claim 11, characterized in that the device further comprises one or more static mixers that are connected to the inlet units.

14. A process for preparing a three-dimensional article or sheet using additive manufacturing methods, characterized in that one or more slips are discharged layer-wise onto a surface using the device according to claim 1, and selectively cured in accordance with a predetermined geometry.

15. The process according to claim 14, characterized in that several slips having different compositions are employed.

16. The process according to claim 14, characterized in that said three-dimensional article has a composition and/or properties that vary over parts or all of the three-dimensional article.

17. The device according to claim 1, characterized in that said gap has a width of at least 300 µm.

18. The device according to claim 3, characterized in that said sealing element is in the form of a gasket, an O ring seal, or a lip seal.

19. The process according to claim 16, characterized in that said three-dimensional article has a composition and/or properties that vary in x and/or y directions over parts or all of the article.

* * * * *